(12) United States Patent
Ghanea-Hercock

(10) Patent No.: US 10,754,879 B2
(45) Date of Patent: Aug. 25, 2020

(54) SIGNAL IDENTIFICATION

(71) Applicant: British Telecommunications Public Limited Company, London (GB)

(72) Inventor: Robert Ghanea-Hercock, London (GB)

(73) Assignee: British Telecommunications Public Limited Company, London (GB)

( * ) Notice: Subject to any disclaimer, the term of this patent is extended or adjusted under 35 U.S.C. 154(b) by 224 days.

(21) Appl. No.: 15/739,011

(22) PCT Filed: May 27, 2016

(86) PCT No.: PCT/EP2016/061992
§ 371 (c)(1),
(2) Date: Dec. 21, 2017

(87) PCT Pub. No.: WO2016/206910
PCT Pub. Date: Dec. 29, 2016

(65) Prior Publication Data
US 2018/0181642 A1 Jun. 28, 2018

(30) Foreign Application Priority Data
Jun. 24, 2015 (EP) .................................. 15275160

(51) Int. Cl.
*G06F 16/28* (2019.01)
*G06F 16/35* (2019.01)
*G06F 17/11* (2006.01)
*G06F 17/10* (2006.01)
*G06F 21/55* (2013.01)
(Continued)

(52) U.S. Cl.
CPC ............ *G06F 16/285* (2019.01); *G06F 16/35* (2019.01); *G06F 17/10* (2013.01); *G06F 17/11* (2013.01); *G06F 21/552* (2013.01); *G06K 9/00523* (2013.01); *G06T 11/206* (2013.01)

(58) Field of Classification Search
USPC .................................................. 707/737, 687
See application file for complete search history.

(56) References Cited

PUBLICATIONS

Franz Sauer et al., "Trajectory-based Flow feature tracking in Joint Particle/Volume Datasets", vol. 20, No. 12, Dec. 2014.*
(Continued)

*Primary Examiner* — Hung T Vy
(74) *Attorney, Agent, or Firm* — Patterson Thuente Pedersen, P.A.

(57) ABSTRACT

A computer implemented method for identifying a signal in a sequence of numerical values, the method including: converting the sequence of numerical values into a vector sequence by converting each value in the sequence to a normalized vector representation; generating a vector field comprising the vector sequence as a multi-dimensional data structure such that vectors in the vector sequence are plotted in sequence in the vector field; modeling a simulated flow of particles through the vector field such that a flow of each particle is influenced by vectors in the vector field; generating one or more static representations of the particles, each representation being generated at a particular point in time; and performing feature detection on each of the one or more static representations to identify features in the representation corresponding to the signal.

14 Claims, 6 Drawing Sheets

(51) Int. Cl.
   *G06K 9/00* (2006.01)
   *G06T 11/20* (2006.01)

(56) References Cited

PUBLICATIONS

International Search Report for corresponding International Application No. PCT/EP2016/061992 dated Jul. 7, 2016; 3 pages.
Written Opinion of the International Searching Authority for corresponding International Application No. PCT/EP2016/061992 dated Jul. 7, 2016; 8 pages.
Sauer Franz et al: "Trajectory-Based Flow Feature Tracking in Joint Particle/Volume Datasets", IEEE Transactions on Visualization and Computer Graphics, IEEE Service Center, Los Alamitos, CA, US, val. 20, No. 12, Dec. 31, 2014 (Dec. 31, 2014), pp. 2565-2574, XP011563273, ISSN: 1077-2626, DOI: 10.11 09/TVCG.2014. 2346423 [retrieved on Oct. 23, 2014].
Panigrahi Chhabi Rani et al: "Malware Detection in Big Data Using Fast Pattern Matching: A Hadoop Based Comparison on GPU". Dec. 10, 2014 (Dec. 10, 2014). Grid and Cooperative Computing— GCC 2004 : Third international conference. Wuhan. China. Oct. 21-24, 2004 In: Lecture Notes in Computer Science ISSN 0302-9743 ; vol. 3251; [Lecture Notes in Computer Science ISSN 1611-3349]. Springer Verlag XP047297007. ISBN: 978-3-642-24711-8.
Abhishek Karnik et al: "Detecting Obfuscated Viruses Using Cosine Similarity Analysis". Modelling & Simulation. 2007. AMS '07. First Asia Internation Al. Conference On. IEEE. PI. Mar. 2007 (Mar. 2007). pp. 165-170. XP031073704. ISBN: 978-0-7695-2845-8.
Cardenas Alvaro A et al: "Big Data Analytics for Security". Security & Privacy. IEEE. IEEE Service Center. Los Alamitos. CA. US. vol. 11. No. 6. Nov. 2013 (Nov. 2013), pp. 74-76. XP011533948. ISSN: 1540-7993. DOI: 10.1109/MSP.2013.138 [retrieved on Dec. 12, 2013].

\* cited by examiner

SIGNAL IDENTIFICATION

CROSS-REFERENCE TO RELATED APPLICATIONS

The present application is a National Phase entry of PCT Application No. PCT/EP2016/061992, filed on 27 May 2016, which claims priority to EP Patent Application No. 15275160.8, filed on 24 Jun. 2015, which are hereby fully incorporated herein by reference.

TECHNICAL FIELD

The present disclosure relates to the identification of signals and specifically the identification of signals in sequences of numerical values.

BACKGROUND

Sequences of numerical data items can be analyzed in many ways to identify themes, patterns, repetitions, information, encoded data, codes or other signals in the data. It is a common requirement when processing numerical sequences to identify characteristics of the data for classification, categorization, characterization, comparison, grouping, indexing, searching, similarity analysis and the like. For example, in a computer system having a network, it can be desirable to classify data in a sequence of network events or data packets so as to identify data that is malicious in order to provide network protection mechanisms. Numerical sequences can be recorded, modeled and compared using sequence identification, data correlation and/or clustering techniques.

The generation of large quantities of data such as numerical sequences that are potentially complex and/or unstructured presents challenges for traditional data processing techniques. Such data can arise from sensors, data collection points, vehicles, people, devices, telecommunications services and facilities, medical services and facilities and many other sources. Data processing operations such as analysis, categorization, classification, search and visualization present real challenges with such data. In some contexts such data has been described as "big data" and these challenges can be described as the "big data problem".

Furthermore, it is increasingly desirable to extract meaning from numerical sequences where traditional data analysis approaches fail to identify meaningful patterns or characteristics. Such meaning can be considered to be a signal residing, encoded or present in a numerical sequence. Such signals can be sparsely distributed across a numerical sequence and/or there may be a low signal to noise ratio. A signal of interest corresponding to a characteristic of a numerical sequence may therefore not be readily identifiable.

Accordingly it would be advantageous to identify signals in numerical sequences.

SUMMARY

The present disclosure accordingly provides, in a first aspect, a computer implemented method for identifying a signal in a sequence of numerical values, the method comprising: converting the sequence of numerical values into a vector sequence by converting each value in the sequence to a normalized vector representation; generating a vector field comprising the vector sequence as a multi-dimensional data structure such that vectors in the vector sequence are plotted in sequence in the vector field; modeling a simulated flow of particles through the vector field such that a flow of each particle is influenced by vectors in the vector field; generating one or more static representations of the particles, each representation being generated at a particular point in time; performing feature detection on each of the one or more static representations to identify features in the representation corresponding to the signal.

In some embodiments, each value in the sequence of numerical values is converted to a normalized vector representation by: normalizing the value; modulating the normalized value to 2*pi radians to generate an angular representation of the value; and generating a normalized vector based on the angular representation of the value.

In some embodiments, modeling a simulated flow of particles includes continuously generating particles as data items each having a spatial location at an edge of the vector field, the location of each particle changing over time in an initial direction so as to initially flow into the vector field.

In some embodiments, the multi-dimensional data structure is a two dimensional data structure and the particles are generated across an edge at one extremity of the vector field.

In some embodiments, the multi-dimensional data structure is a three dimensional data structure and the particles are generated across a plane at one extremity of the vector field.

In some embodiments, the feature detection includes one or more of: edge detection; corner detection; and/or blob detection.

In some embodiments, a plurality of static representations are generated and the feature detection includes detection of a pattern of particles occurring in a static representation that is repeated in one or more of the other static representations.

In some embodiments, the pattern includes a particular arrangement of particles.

In some embodiments, pattern includes a particular particle density.

In some embodiments, the features are used for one or more of: classifying; comparing; clustering; grouping; and/or indexing the sequence of numerical values.

The present disclosure accordingly provides, in a second aspect, a method for comparing a pair of sequences of numerical values comprising: for each of the sequences, identifying a signal by the method of any preceding claim; generating a similarity metric based on an identification of common features in static representations for each of the sequences.

The present disclosure accordingly provides, in a third aspect, a signal identification apparatus to identify a signal in a sequence of numerical values, the apparatus comprising: a vector generator having logic directed to the conversion of the sequence of numerical values into a vector sequence by converting each value in the sequence to a normalized vector representation; a vector field generator having logic directed to the generation of a vector field comprising the vector sequence as a multi-dimensional data structure such that vectors in the vector sequence are plotted in sequence in the vector field; a particle flow simulator having logic directed to model a simulated flow of particles through the vector field such that a flow of each particle is influenced by vectors in the vector field; a snapshot generator having logic directed to generate one or more static representations of the particles, each representation being generated at a particular point in time; a feature detector having logic directed to identifying features in each of the one or more static representations, the features corresponding to the signal.

The present disclosure accordingly provides, in a fourth aspect, a computer system comprising a processor and a data store, the processor being adapted to: convert the sequence of numerical values into a vector sequence by converting each value in the sequence to a normalized vector representation; generate a vector field comprising the vector sequence as a multi-dimensional data structure such that vectors in the vector sequence are plotted in sequence in the vector field; model a simulated flow of particles through the vector field such that a flow of each particle is influenced by vectors in the vector field; generate one or more static representations of the particles, each representation being generated at a particular point in time; perform feature detection on each of the one or more static representations to identify features in the representation corresponding to the signal.

The present disclosure accordingly provides, in a fifth aspect, a computer program element comprising computer program code to, when loaded into a computer system and executed thereon, cause the computer to perform the steps of a method described above.

BRIEF DESCRIPTION OF THE DRAWINGS

An embodiment of the present disclosure will now be described, by way of example only, with reference to the accompanying drawings, in which.

DETAILED DESCRIPTION

Figure 1:
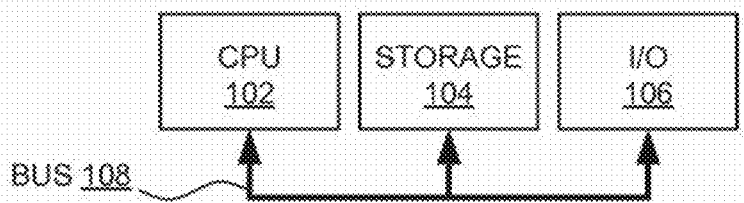
FIG. 1 is a block diagram of a computer system suitable for the operation of embodiments of the present disclosure.

FIG. 1 is a block diagram of a computer system suitable for the operation of components in embodiments of the present disclosure. A central processor unit (CPU) 102 is communicatively connected to storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
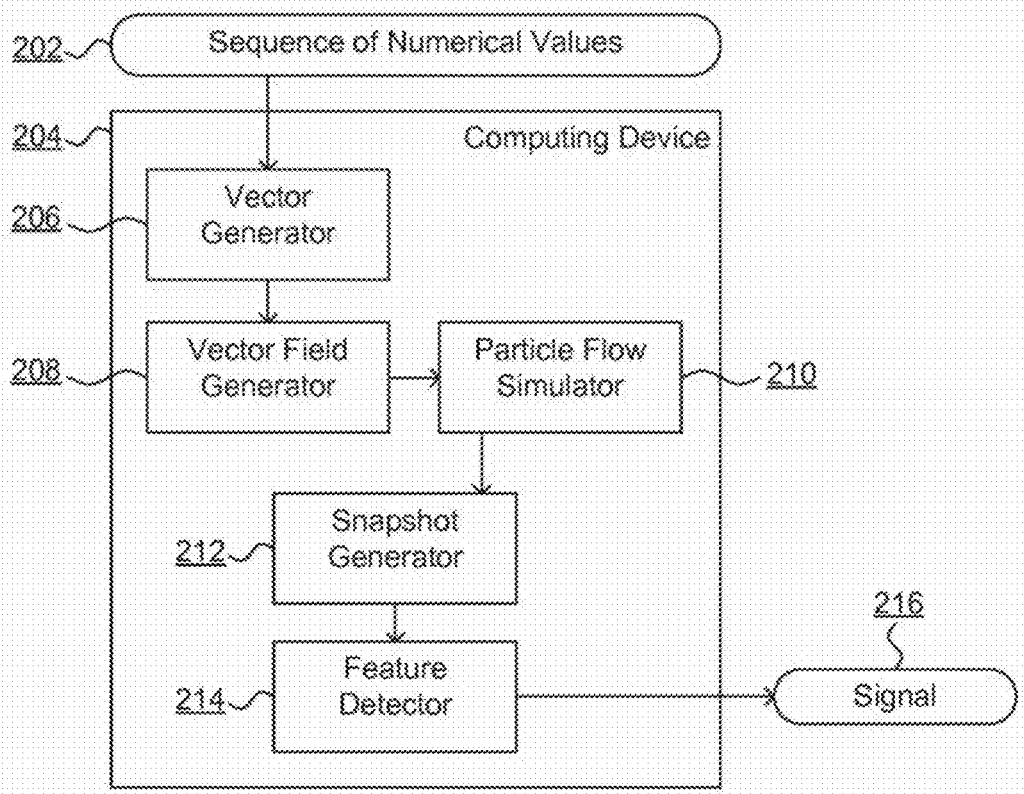
FIG. 2 is a block diagram of a signal identification apparatus in accordance with embodiments of the present disclosure.

FIG. 2 is a block diagram of a signal identification apparatus 204 in accordance with embodiments of the present disclosure. The signal identification apparatus 204 of FIG. 2 is a computing device 204 such as a computing system according to FIG. 1. The computing device 204 receives as input a sequence of numerical values 202. For example, the sequence of numerical values 202 can include time series data or batches of ordered numerical data arising from a single, a discrete number or a constant stream of events, occurrences or values. Thus the sequence of numerical values 202 can include, by way of example only: in computer networking, network traffic or characteristics thereof; in computer processing, instruction sequences or characteristics thereof; in computer systems, data stored in volatile or non-volatile memories of one or more computer systems, or characteristics thereof; sequences of events occurring in, generated by or resulting from computer or other systems such as by the execution of software, network communication and the like, or characteristics thereof; data processed or generated by security services including intrusion or malware detection including network data and/or events, or characteristics thereof; logging information such as logs of access control information including physical security (such as physical access control via door locks or other means) and virtual security (such as computer system access control); geographic or geospatial information such as a series of geographic locations, geospatial points or coordinates in a multi-dimensional space; big-data sequences such as sensor data, medical data, demographic information, weather or climate data, travel or transport data, population data, behavioral data, monitoring data; and the like.

It will be appreciated by those skilled in the art that, where a data sequence includes data items being partly or entirely non-numeric, such data items can be converted to, or represented by, a numeric value using a suitable conversion mechanism to form the sequence of numerical values 20. For example, digital representations of analogue sequences can be employed with a suitable analogue to digital conversion technique as are known to those skilled in the art. Further, numeric representations of character data, such as by way of character encoding, can be employed. For example, in the context of computer network traffic, a sequence of data items may be a sequence of internet protocol (IP) addresses in dot decimal format. Such addresses are readily converted to their equivalent decimal value.

In some cases data items in a sequence can include multiple parts as composite data items. Where data items in a sequence include multiple parts, such as multiple fields, data structures or records, each part can be treated as a separate sequence.

Alternatively, where data items include multiple parts, combining two or more such parts can be achieved by conversion to a numerical representation using an appropriate conversion function. The exact nature of such a function depends on the data items, their structure and data type and any requirement for preservation of uniqueness (between parts of data items and/or the data items themselves in the sequence) and/or comparability (between parts of data items and/or data items themselves). For example, in the context of computer network traffic, data packets may include a 5-tuple of network protocol information as separate fields, such as: source address; destination address; source port; destination port; protocol identification. Each such field may or may not be numeric. For example a protocol may be identified by an alphanumeric field. Two or more such fields can be converted into a single numeric value by a conversion function to represent the data item in the sequence.

A conversion function can take many forms. For example, a conversion function can be provided as an encoder in order to encode field information numerically in a single numeric value. An encoder conversion function may operate to encode field information numerically in a single numeric value. Such encoding can be bitwise, such that different parts of a binary word are populated with numerical representations of different fields. Such a bitwise approach has the advantage that fields encoded in higher-order bits are more significant and therefore such fields are readily comparable between data items in a sequence. Alternatively such encoding can be achieved by way of a hashing function which generates a substantially unique output for different inputs. Other conversion functions providing a numerical sequence for a sequence of composite data items will be apparent to those skilled in the art.

Additionally or alternatively, composite data items can be accommodated in embodiments of the present disclosure by encoding such multiple data items in a vector representation as will be discussed below, in which case multiple separate sequences of numerical values may be converted to a single sequence of vectors, or vector sequence.

The computing device 204 includes a vector generator 206 as a hardware, software, firmware or combination component configured to access or receive a sequence of numerical values 202 and generate a vector sequence. The vector generator 206 converts each value in the sequence of numerical values 202 to a normalized vector representation. The normalized vector representations are then stored as a vector sequence, the order of vectors in which corresponds to the order of values in the sequence of numerical values 202.

In one embodiment each value in the sequence of numerical values 202 is initially normalized to a fixed range, for example normalized between 0 and 1. The normalization can be based on the data type or format of the values in the sequence of numerical values 202 such that an upper and lower bound can be determined with values normalized with respect to such bounds. Alternatively the normalization can be undertaken with reference to the particular values in the sequence of numerical values 202, or with reference to values in historical or other sequences of numerical values, to form a profile of values giving a range within which numerical values in the sequence 202 occur. Normalization can thus be undertaken based on such a range.

Each normalized value in the sequence 202 is then modulated to an angular representation by, for example, modulation to $2\pi$ radians (2*pi radians) or 360 degrees. For example, where values are normalized to a range of 0 to 1 then such modulation can be achieved by multiplying the normalized value by $2\pi$ to obtain an angular representation of the value. Subsequently the angular representation of each value is converted to a normalized vector. The vector is normalized such that all vectors have the same scalar magnitude, such as a unit magnitude of 1. The conversion of an angle into a vector can be achieved using trigonometric functions.

As described above, a sequence of data items from which the sequence of numerical values 202 is obtained can comprise data items having multiple parts as composite data items. Where data items in such a sequence include multiple parts, such as multiple fields, data structures or records, each part can be treated as a separate numerical value and thus multiple sequences of numerical values may result (each sequence being aligned with each other sequence such that aligned values in the sequences correspond to the same data item in the sequence of data items from which the sequence of numerical values derive). Where there are multiple sequences of numerical values it is possible to combine numerical values from each of the multiple sequences into a single vector representation.

For example, three aligned sequences of numerical values can be converted into a three dimensional vector. Numerical value from each of three aligned sequence (each corresponding to a common data item in an originating data source) is initially normalized and then converted to angular representation as described above. The three angles are then used to define a normalized three dimensional vector (such as having a magnitude of 1). In this way a composite data from which three numerical values are derived are combined in a single normalized three dimensional vector representation.

Embodiments of the present disclosure employ spatial simulation techniques including simulated particle flow and accordingly two or three dimensional vector representations are advantageous.

The computing device 204 further includes a vector field generator 208 as a software, hardware, firmware or combination component. The vector field generator 208 maps or plots vectors in the vector sequence across one or more planes in a coordinate system, such as a Cartesian coordinate system, to generate a field of vectors. The vector field can be represented as a multi-dimensional data structure such as a two or three dimensional array of vectors or a table of vectors where each entry in the array or table corresponds to a spatial location in the coordinate system. Conceivably the vector field can be stored as a bitmapped data structure in which vectors are encoded at spatial locations in the bitmap. The vector field has defined dimensions or edges within the coordinate system and vectors in the vector sequence are stored in sequence order within the vector field.

Figure 5:
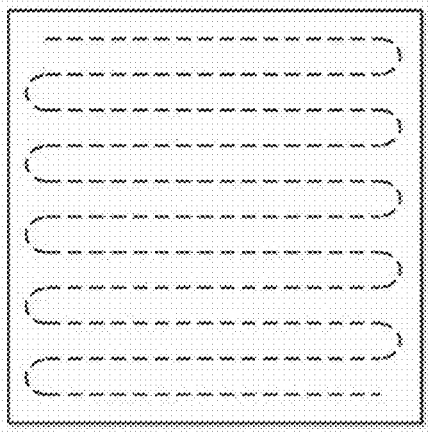
FIG. 5 is a representation of an exemplary mapping of a vector sequence in a two dimensional vector field in accordance with embodiments of the present disclosure.
Figure 6:
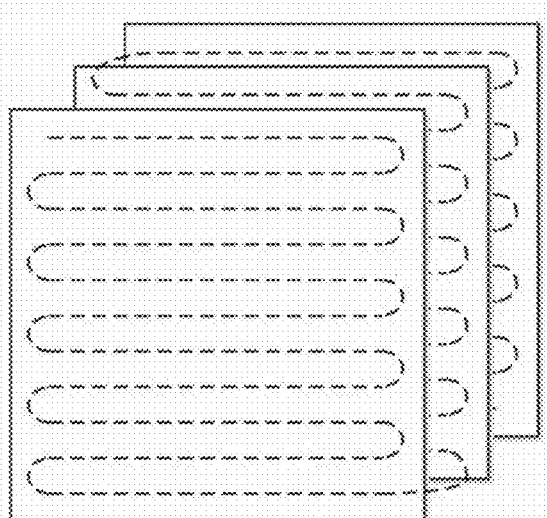
FIG. 6 is a representation of an exemplary mapping of a vector sequence in a three dimensional vector field in accordance with embodiments of the present disclosure.

The arrangement of vectors in the vector field is undertaken in accordance with a predetermined layout. For example, FIG. 5 is a representation of an exemplary mapping of a vector sequence in a two dimensional vector field in accordance with embodiments of the present disclosure. As illustrated in the arrangement of FIG. 5 vectors are laid out in a coordinate system a row at a time with the vector sequence wrapping at the ends of each row and returning in the opposite direction in a subsequent row. Notably the arrangement of FIG. 5 is purely exemplary and other arrangements and layouts of vectors in the vector field could alternatively be used, for example: columnar arrangements; arrangements without wrapping at the end of each row/column; diagonally arranged vectors; arrangements spiraling in or out of the vector field; and other suitable arrangements. In all embodiments the order of the vectors in the vector sequence is maintained such that the original sequence of numerical values reflected in the sequence of vectors is also maintained in the vector field. FIG. 6 is a representation of an exemplary mapping of a vector sequence in a three dimensional vector field in accordance with embodiments of the present disclosure. As can be seen in FIG. 6 the vector sequence is mapped or plotted to multiple planes in a coordinate system so as to form the three dimensional vector field. Notably the particular arrangement of vectors illustrated in FIG. 6 is purely exemplary and other arrangements can be employed, such as distributions in sequence across the z-axis (i.e. across the planes in sequence).

The arrangement of vectors in the vector field can be such that the vectors are positioned at contiguous spatial locations within the field with no spacing therebetween, or alternatively the vectors can be spaced in the field leaving spatial locations between vectors absent of vectors. In some embodiments spacing is employed between the vectors where such spacing is consistent and identical across all vectors in the vector field. In a three dimensional vector field such spacing occurs also between the planes in which the vectors are arranged, with the spacing between planes being the same as the spacing between vectors in a plane. Thus, for example with reference to the arrangement of FIG. 5, vectors can be sequentially mapped or plotted at spatial locations a fixed distance, d, apart in the coordinate system of the vector field with each row also being spaced distance d apart such that all vectors are spaced distance d from any other vector.

Figure 4:
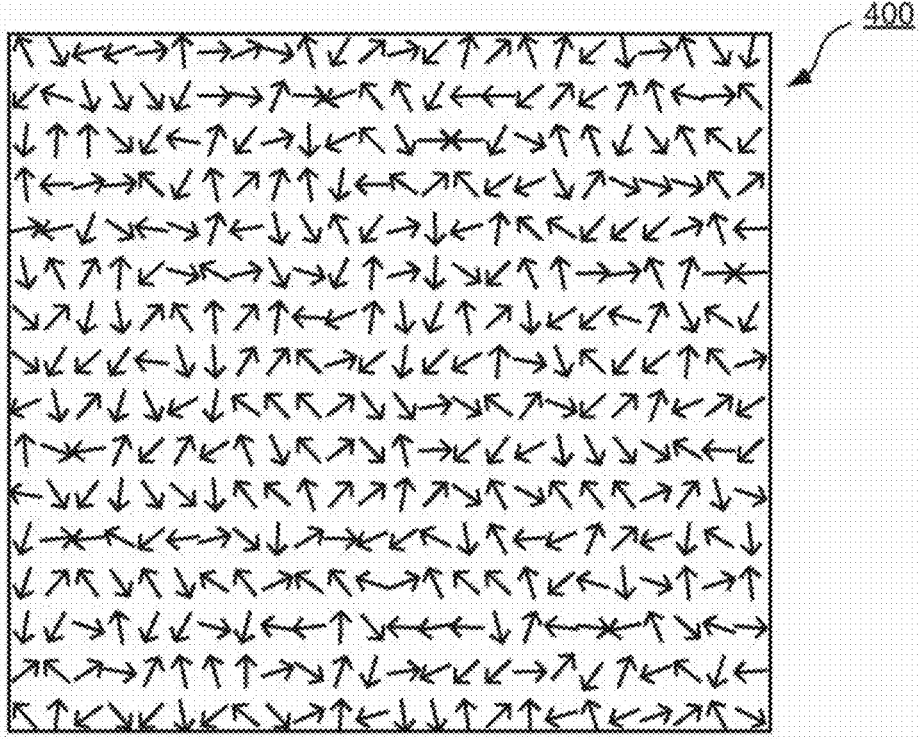
FIG. 4 is a representation of a vector field in accordance with embodiments of the present disclosure.

FIG. 4 is a representation of a vector field 400 such as may be generated by the vector field generator 208 in accordance with embodiments of the present disclosure. Thus it can be seen from the exemplary two dimensional vector field 400 that vectors are arranged spatially spaced in the vector field coordinate system within defined edges of the vector field. The vector field is rectangular for convenient and efficient storage as a two dimensional data structure in computer device 204 though conceivably the vector field 400 could have a different shape (whether two dimensionally or three dimensionally).

Figure 7:
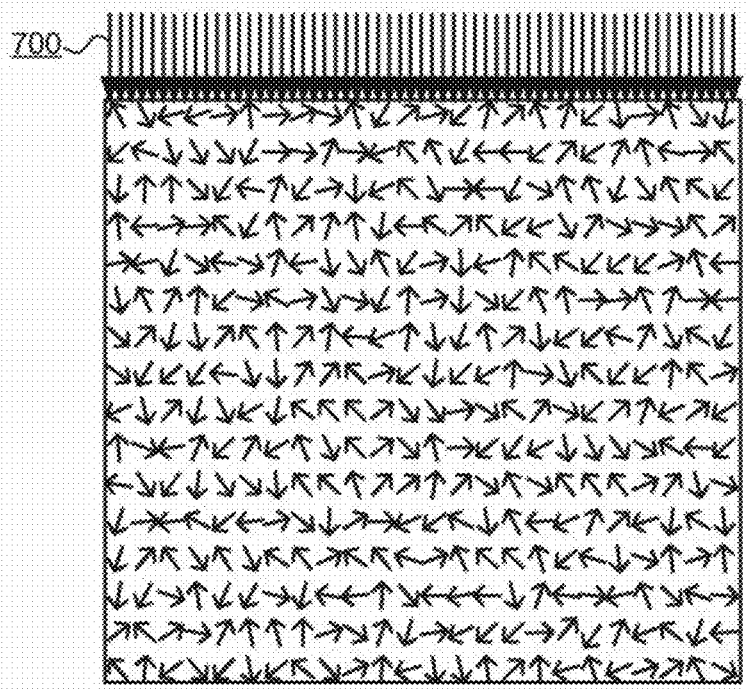
FIG. 7 is a representation of the generation of a simulated flow of particles for a two dimensional vector field in accordance with embodiments of the present disclosure.
Figure 8:
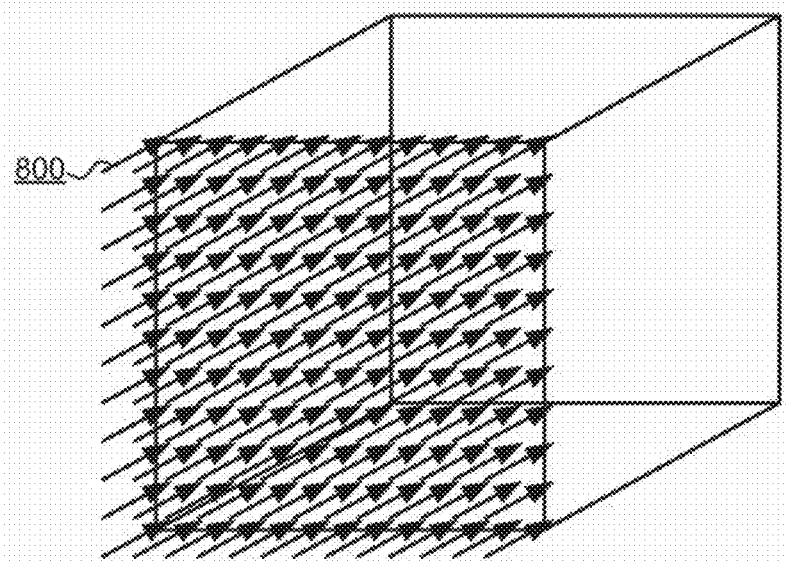
FIG. 8 is a representation of the generation of a simulated flow of particles for a three dimensional vector field in accordance with embodiments of the present disclosure.

The computing device 204 further includes a particle flow simulator 210 as a software, hardware, firmware or combination component for simulating a flow of virtual or logical particles through a vector field generated by the vector field generator 208 such that a direction of flow of each particle is determined by vectors in the vector field. The simulated particles thus flow, i.e. move, through the vector field having been initially introduced to the vector field at particular locations. A particle is a logical representation of an entity flowing through the vector field. The particle can be a data structure having a spatial location in the vector field encoded therein. Alternatively all particles can be simulated together by the particle flow simulator 210 where the particle flow simulator 210 tracks and updates a spatial location of each particle as a virtual or logical entity. The simulated flow of particles is modeled in the sense that each particle can be plotted, mapped or indicated in or in association with the vector field. For example, where the vector field is a bitmapped data structure, particles can be modeled, plotted or rendered in a second bitmapped data structure having dimensions and coordinate system characteristics consistent with a vector field bitmap for overlay on the vector field bitmap to indicate a location of each simulated particle.

Where the vector field is two dimensional the particles are preferably provided to the vector field distributed along one edge of the vector field such that the particles enter the vector field along the edge and flow into the vector field. Most preferably the distribution of particles along the edge is even. FIG. 7 is a representation of the generation of a simulated flow of particles 700 for a two dimensional vector field in accordance with embodiments of the present invention. As can be seen from FIG. 7 the particles 700 are introduced to the vector field along one edge, such as by generating particles having an initial spatial location along the edge. Any suitable edge may be used.

Where the vector field is three dimensional the particles can be provided to the vector field distributed across one external plane of the vector field such that the particles enter the vector field through the plane and flow into the vector field. In one embodiment the distribution of particles across the plane is even. FIG. 8 is a representation of the generation of a simulated flow of particles 800 for a three dimensional vector field in accordance with embodiments of the present disclosure. As can be seen from FIG. 8 the particles 800 are introduced to the vector field across one plane, such as by generating particles having an initial spatial location on the plane. Any suitable plane may be used, such as an external plane being an outermost plane in the three dimensional coordinate system of the vector field.

In some embodiments particles are generated to flow through the vector field continuously. In one embodiment particles have a defined life as a duration during which they exist and are deleted or discarded when this duration has passed.

Simulated particles move or flow through the vector field such that a flow of each particle is influenced by vectors in the vector field. As such each particle has an initial direction of flow so as to initially flow into the vector field. Such initial direction of flow can itself be modeled as a vector for each particle, referred to herein as a flow vector for a particle. Particles move through the coordinate system of the vector field and as a particle encounters a vector disposed spatially at a location in the particle field then the vector influences a flow of the particle. The flow can be influenced by affecting a direction and/or speed of flow of the particle through the vector field. Put another way a vector influences a flow vector of a particle. The influence is such as to impart at least some of the properties of the encountered vector in the vector field onto the flow vector of the particle such that the flow of the particle changes to some degree in accordance with the encountered vector.

A particle encounters a vector in the particle field when a spatial location of the particle is within a defined distance of a spatial location of the vector in the field. The defined distance may be such as to permit vectors closer to the particle to influence the particle in preference over vectors further from the particle. In one embodiment a degree to which a vector influences a flow vector of a particle is related to a distance between the particle and the vector such that vectors closer to a particle have greater influence on the flow of the particle.

In one embodiment, a vector in the vector field influences a flow of a particle by combining to some extent the vector with a flow vector for the particle so as to change the flow vector for the particle and accordingly affect the speed and/or direction of flow of the particle. Such combining can be achieved by performing a dot product operation of the vector in the vector field with a flow vector for the particle and assigning the dot product as a new flow vector for the particle. In some embodiments such a dot product operation uses a vector in the vector field scaled to reflect a distance between the particle and the vector such that more proximate vectors have more influence over the flow of the particle.

Accordingly particles flow through the vector field with changes to their flow influenced by each vector encountered in the field. The particular location of particles in the vector field is maintained over time by the particle flow simulator 210 that can perform the operations described above and the particular spatial locations of each particle at a point in time can be determined with reference to the particle flow simulator 210.

The computing device 204 further includes a snapshot generator 212 as a hardware, software, firmware or combination component having logic directed to generate one or more static representations of the particles, each representation being generated at a particular point in time. A static representation is a representation of the coordinate system of the vector field with locations of particles indicated at a particular point in time. For example, in one embodiment the static representation is a bitmap image representing the coordinate system and having a location of each particle indicated as a point or other indicator in the bitmap at the appropriate spatial location. Accordingly a static representation of the particles provides a snapshot of the particle locations when flowing through the vector field at a point in time. The snapshot thus provides a representation or image of the particles at a point in time that can be informative as to features of the underlying sequence of numerical values 202 corresponding to the vectors in the vector field. For example, signals encoded, embedded, inherent or otherwise present or occurring in the sequence of numerical values 202 can exhibit is features in the static representation generated by the snapshot generator 212 such as aggregations, collections, lines, strata, blobs, corners or other features within the static representation. Such features can accordingly serve to identify one or more particular signals in the underlying sequence of numerical values 202 as a representation of features and/or characteristics of the sequence of numerical values 202. Accordingly, embodiments of the present disclosure provide for the classification, categorization, comparison, identification, searching or otherwise processing of the sequence of numerical values 202 based on features identified in a static representation generated by the snapshot generator 212.

Figure 9:
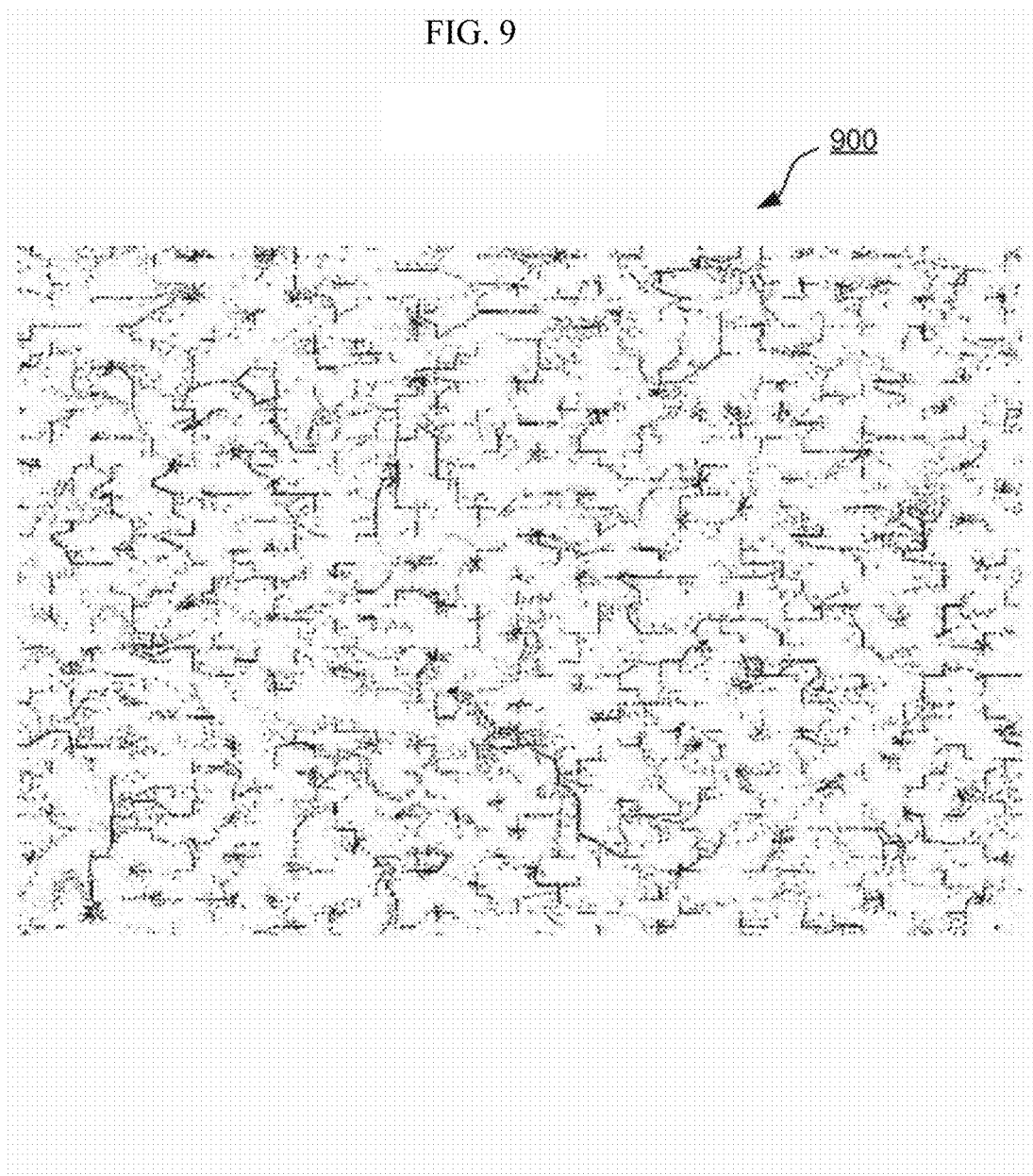
FIG. 9 is an illustrative depiction of a static representation of particles in an exemplary vector field in accordance with embodiments of the present disclosure.

FIG. 9 is an illustrative depiction of a static representation 900 of particles in an exemplary vector field in accordance with embodiments of the present disclosure. In the example of FIG. 9 each point within the static representation corresponds to a simulated particle at a particular spatial location within a vector field at a particular point in time. It can be seen from FIG. 9 that various features arise from the vector field and particle flow exhibited as clusters, lines, corners and aggregations of particles in certain locations with areas having few or no particles indicated as whitespace. Features such as these can be identified, extracted and/or emphasized using a feature detector 214.

Accordingly the computing device 204 further includes a feature detector 214 as a software, hardware, firmware or combination component having logic directed to identifying features in static representations generated by the snapshot generator 212. In one embodiment the static representations are stored as images and the feature detector 214 can be an image feature extraction component for processing images such as an edge detection component, a corner detection component or a blob detection component such as are known in the art. Additionally or alternatively the feature detector 214 includes logic to perform one or more of: edge enhancement; image enhancement in the spatial domain; and/or noise reduction. Notably any image enhancement or noise reduction functions or filters applied to the image must be sensitive not to remove the key features of the image indicative of a signal in the image. Such features may be repeating features specifically addressed by some filters (e.g. structured noise reduction filters can seek to remove repeating elements occurring in an image).

In one embodiment feature detection by the feature detector 214 extends beyond image feature detection functions and further includes pattern identification. Pattern identification can include the identification of a series of features or patterns of particles in a static representation that occur multiple times in the same static representation or that occur in multiple static representations corresponding to different points in time. Patterns can be particular arrangements of particles and/or particular particle densities occurring in regions of a static representation, for example. Such patterns can be indicative of a signal in the underlying sequence of numerical values 202 and so constitute features of a static representation. For the purpose of pattern identification and repetition, a particular range of pattern dimensions may be selected so as to preclude frequently occurring patterns of small numbers of particles, for example. Further, a static representation may have a mask repeatedly applied to identify patterns occurring therein by evaluating a similarity of parts of the static representation with other parts of the static representation or other static representations. Such a mask may have a regular shape such as a rectangle or may have an irregular shape. Furthermore, masks of differing and/or varying shapes and/or sizes can be employed for pattern identification.

Features present in a static representation or based on a number of static representations serve to identify signals within an underlying sequence of numerical values 202. Accordingly such features can be used to classify, compare, cluster, group and/or index sequences of numerical values. For example, a pair of sequences of numerical values exhibiting a number of features in common can be determined to include a common signal. An extent of similarity can be predefined in terms of, for example: a number of common features in common; a degree of similarity or identity of the features in common; similarity of locations of the features in static representations for difference sequences of numerical values; features as particular patterns occurring static representations that are determined to be indicative of a particular signal such as a characteristic of the numerical data; and the like.

For example, multiple sequences of numerical data arising from computer network traffic that is known to include malware can be processed by a computing device 204 in accordance with embodiments of the present invention to identify common features. Additionally, multiple sequences of numerical data arising from computer network traffic that is known not to include malware is also processed to identify common features. Subsequently the features from the malware traffic are compared with the features of the non-malware traffic to identify potential indicators of the malware traffic. Subsequently, live traffic can be analyzed and processed by the computing device 204 to identify features for comparison with the features indicating malware traffic. In response to identifying features indicative of malware traffic in live traffic, remedial action can be taken.

Figure 10:
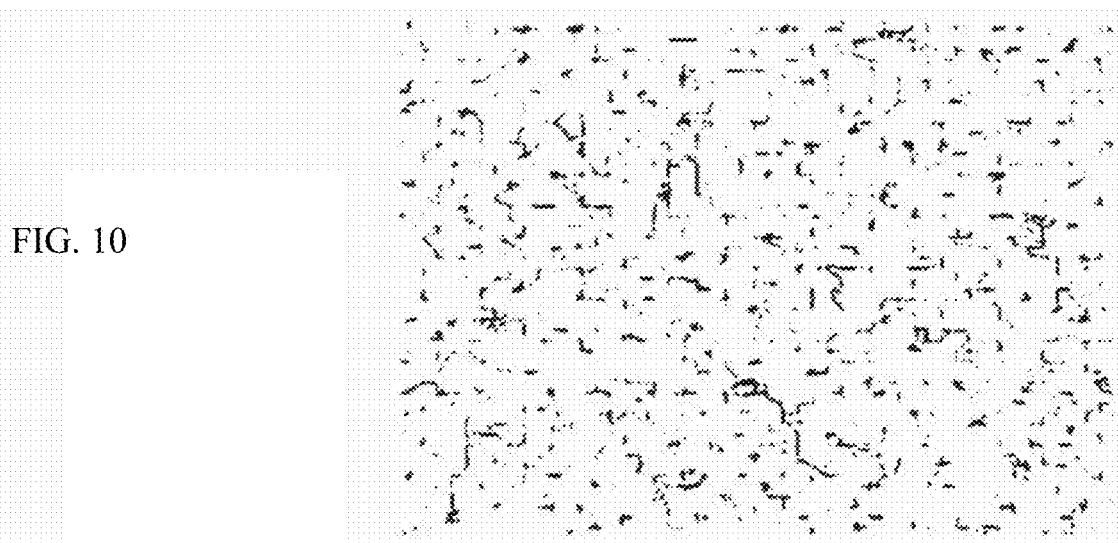
FIG. 10 is an illustrative depiction of the static representation of FIG. 9 having first features detected in accordance with embodiments of the present disclosure.

To illustrate an exemplary approach to feature extraction, FIG. 10 is an illustrative depiction of the static representation of FIG. 9 having first features detected in accordance with embodiments of the present disclosure. FIG. 10 corresponds to the static representation 900 processed by a blob detection function such that regions of the static representation having a particular density of particles are detected.

Figure 11:
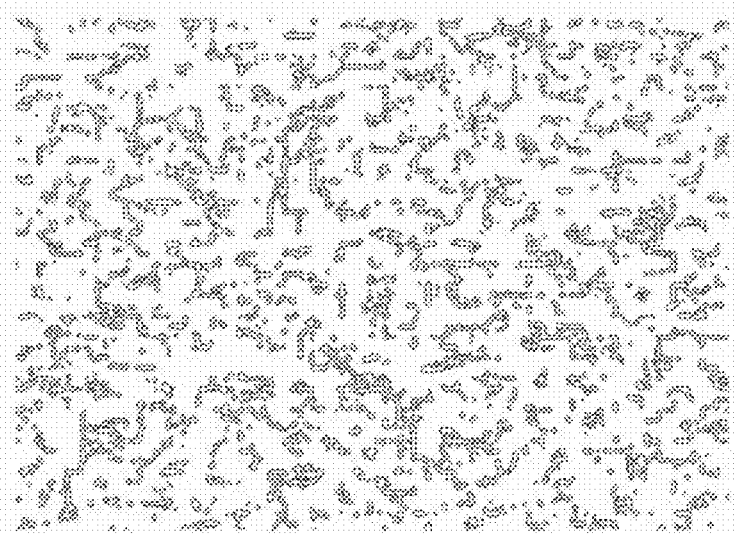
FIG. 11 is an illustrative depiction of the static representation of FIG. 9 having second features detected in accordance with embodiments of the present disclosure.

FIG. 11 is an illustrative depiction of the static representation of FIG. 9 having second features detected in accordance with embodiments of the present disclosure. FIG. 11 corresponds to the static representation 900 processed by an edge detection function such that edges in the static representation 900 are detected.

Figure 12:
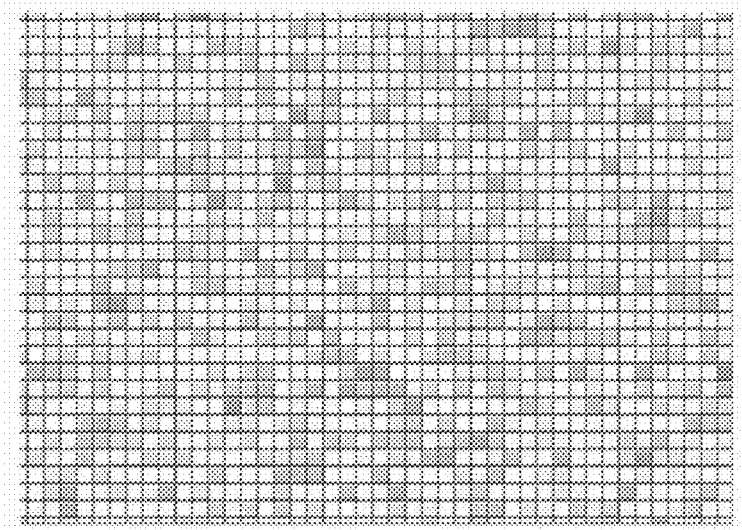
FIG. 12 is an illustrative depiction of the static representation of FIG. 9 having third features detected in accordance with embodiments of the present disclosure.

FIG. 12 is an illustrative depiction of the static representation of FIG. 9 having third features detected in accordance with embodiments of the present disclosure. FIG. 11 corresponds to the static representation 900 processed by clustering and summarization function such that the static representation 900 is partitioned into regular regions that are then shaded with an intensity corresponding to a density of particles in the underlying image.

Figure 3:
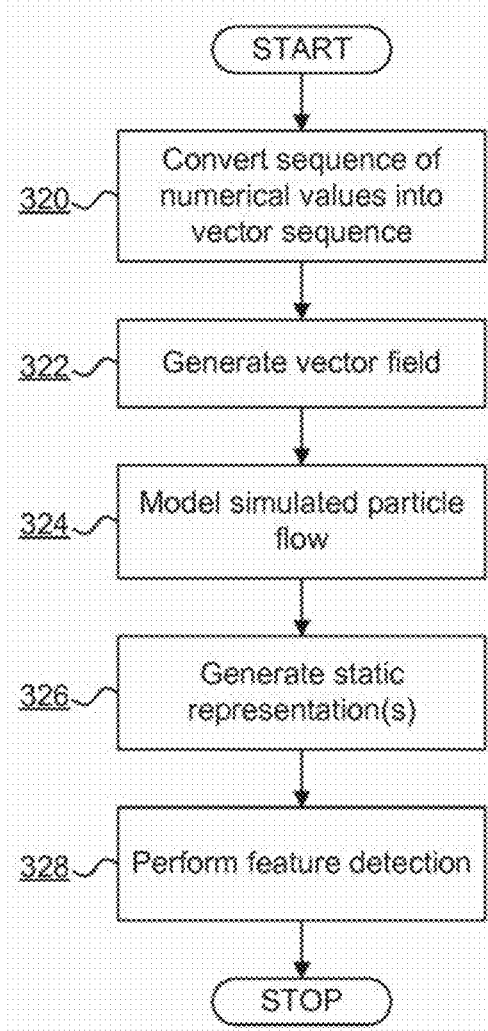
FIG. 3 is a flowchart of a method for identifying a signal in a sequence of numerical values in accordance with embodiments of the present disclosure.

FIG. 3 is a flowchart of a method for identifying a signal in a sequence of numerical values 202 in accordance with embodiments of the present disclosure. Initially, at 320, the method converts the sequence of numerical values 202 into a vector sequence by converting each value in the sequence to a normalized vector representation as hereinbefore described. At 322 a vector field is generated comprising the vector sequence as a multi-dimensional data structure such that vectors in the vector sequence are plotted in sequence in the vector field. At 324 a simulated flow of particles through the vector field is modeled such that a flow of each particle is influenced by vectors in the vector field. At 326 static representations of the particles are generated, each representation being generated at a particular point in time. At 328 feature detection is performed on each of the static representations to identify features in the representation corresponding to the signal.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method for identifying a signal in a sequence of numerical values in data on a computer network, the method comprising:
   converting the sequence of numerical values into a vector sequence by converting each value in the sequence to a normalized vector representation;
   generating a vector field comprising the vector sequence as a multi-dimensional data structure such that vectors in the vector sequence are plotted in sequence in the vector field;
   modeling a simulated flow of particles through the vector field such that a flow of each particle is influenced by vectors in the vector field;
   generating one or more static representations of the particles, each of the one or more static representations being generated at a particular point in time;
   performing feature detection on each of the one or more static representations to identify features in the one or more static representations corresponding to the signal; and
   implementing a protection mechanism in the computer network if the signal is indicative of malicious data in the data on the computer network.

2. The method of claim 1, wherein each value in the sequence of numerical values is converted to a normalized vector representation by:
   normalizing the value;
   modulating the normalized value to 2*pi radians to generate an angular representation of the value; and
   generating a normalized vector based on the angular representation of the value.

3. The method of claim 1, wherein modeling a simulated flow of particles includes continuously generating particles as data items each having a spatial location at an edge of the vector field, the location of each particle changing over time in an initial direction so as to initially flow into the vector field.

4. The method of claim 3, wherein the multi-dimensional data structure is a two-dimensional data structure and the particles are generated across an edge at one extremity of the vector field.

5. The method of claim 3, wherein the multi-dimensional data structure is a three-dimensional data structure and the particles are generated across a plane at one extremity of the vector field.

6. The method of claim 1, wherein the feature detection includes one or more of: edge detection; corner detection; or blob detection.

7. The method of claim 1, wherein a plurality of static representations are generated and the feature detection includes detecting a pattern of particles occurring in a static representation that is repeated in one or more of the other static representations.

8. The method of claim 7, wherein the pattern includes a particular arrangement of particles.

9. The method of claim 7, wherein the pattern includes a particular particle density.

10. The method of claim 1, wherein the features are used for one or more of: classifying; comparing; clustering; grouping; or indexing the sequence of numerical values.

11. A method for comparing a pair of sequences of numerical values, the method comprising:
    for each of the sequences, identifying a signal by the method of claim 1; and generating a similarity metric based on an identification of common features in static representations for each of the sequences.

12. A signal identification apparatus to identify a signal in a sequence of numerical values in data on a computer network, the apparatus comprising:
a processor and memory comprising:
vector generator logic directed to convert the sequence of numerical values into a vector sequence by converting each value in the sequence to a normalized vector representation;
vector field generator logic directed to generate a vector field comprising the vector sequence as a multi-dimensional data structure such that vectors in the vector sequence are plotted in sequence in the vector field;
particle flow simulator logic directed to model a simulated flow of particles through the vector field such that a flow of each particle is influenced by vectors in the vector field;
snapshot generator logic directed to generate one or more static representations of the particles, each of the one or more static representations being generated at a particular point in time;
feature detector logic directed to identify features in each of the one or more static representations, the features corresponding to the signal; and
protection mechanism logic directed to implement a protection mechanism in the computer network if the signal is indicative of malicious data in the data on the computer network.

13. A computer system comprising a processor and a data store, the processor being adapted to identify a signal in a sequence of numerical values in data on a computer network by:
converting the sequence of numerical values into a vector sequence by converting each value in the sequence to a normalized vector representation;
generating a vector field comprising the vector sequence as a multi-dimensional data structure such that vectors in the vector sequence are plotted in sequence in the vector field;
modeling a simulated flow of particles through the vector field such that a flow of each particle is influenced by vectors in the vector field;
generating one or more static representations of the particles, each of the one or more static representations being generated at a particular point in time;
performing feature detection on each of the one or more static representations to identify features in the representation corresponding to the signal; and
implementing a protection mechanism in the computer network if the signal is indicative of malicious data in the data on the computer network.

14. A non-transitory computer-readable storage medium storing a computer program element comprising computer program code to, when loaded into a computer system and executed thereon, cause the computer to perform the method as claimed in claim 1.

* * * * *